United States Patent
Pescatore

(10) Patent No.: US 8,341,499 B2
(45) Date of Patent: Dec. 25, 2012

(54) SYSTEM AND METHOD FOR ERROR DETECTION IN A REDUNDANT MEMORY SYSTEM

(75) Inventor: John C. Pescatore, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 934 days.

(21) Appl. No.: 12/400,651

(22) Filed: Apr. 3, 2009

(65) Prior Publication Data
US 2009/0187806 A1 Jul. 23, 2009

Related U.S. Application Data

(62) Division of application No. 10/960,465, filed on Oct. 7, 2004, now abandoned.

(51) Int. Cl.
*G11C 29/00* (2006.01)
(52) U.S. Cl. .................... 714/773; 714/766; 714/767
(58) Field of Classification Search .............. 714/773, 714/766, 767
See application file for complete search history.

(56) References Cited

U.S. PATENT DOCUMENTS

| | | | | |
|---|---|---|---|---|
| 3,668,644 A * | 6/1972 | Looschen | | 714/6.24 |
| 3,825,905 A * | 7/1974 | Allen, Jr. | | 709/248 |
| 4,276,646 A | 6/1981 | Haggard et al. | | |
| 4,339,804 A * | 7/1982 | Davison et al. | | 711/101 |
| 4,641,310 A * | 2/1987 | Martens et al. | | 714/723 |
| 5,048,022 A * | 9/1991 | Bissett et al. | | 714/763 |
| 5,131,012 A * | 7/1992 | Dravida | | 375/357 |
| 5,175,839 A * | 12/1992 | Ikeda et al. | | 711/200 |
| 5,321,704 A | 6/1994 | Erickson et al. | | |
| 5,455,834 A * | 10/1995 | Chang et al. | | 714/768 |
| 5,517,512 A | 5/1996 | Saegusa | | |
| 5,598,424 A | 1/1997 | Erickson et al. | | |
| 5,689,511 A * | 11/1997 | Shimazaki et al. | | 370/545 |
| 5,691,996 A * | 11/1997 | Chen et al. | | 714/805 |
| 5,761,221 A * | 6/1998 | Baat et al. | | 714/767 |
| 5,768,294 A * | 6/1998 | Chen et al. | | 714/766 |
| 5,774,647 A * | 6/1998 | Raynham et al. | | 714/48 |
| 5,859,859 A | 1/1999 | Kim | | |
| 5,951,694 A * | 9/1999 | Choquier et al. | | 714/15 |
| 5,953,352 A * | 9/1999 | Meyer | | 714/820 |
| 6,003,151 A | 12/1999 | Chuang | | |
| 6,009,547 A | 12/1999 | Jaquette et al. | | |
| 6,061,822 A * | 5/2000 | Meyer | | 714/758 |
| 6,195,780 B1 * | 2/2001 | Dravida et al. | | 714/758 |
| 6,292,919 B1 * | 9/2001 | Fries et al. | | 714/758 |
| 6,434,720 B1 * | 8/2002 | Meyer | | 714/820 |
| 6,467,060 B1 | 10/2002 | Malakapalli et al. | | |
| 6,480,970 B1 * | 11/2002 | DeKoning et al. | | 714/6.12 |
| 6,751,769 B2 * | 6/2004 | Chen et al. | | 714/767 |
| 6,934,904 B2 * | 8/2005 | Talagala et al. | | 714/770 |
| 7,203,890 B1 * | 4/2007 | Normoyle | | 714/768 |
| 7,457,980 B2 * | 11/2008 | Yang et al. | | 714/6.12 |
| 7,809,898 B1 * | 10/2010 | Kiselev et al. | | 711/152 |

* cited by examiner

*Primary Examiner* — Joseph D Torres
(74) *Attorney, Agent, or Firm* — Baker Botts L.L.P.

(57) ABSTRACT

A system and method is disclosed for detecting errors in memory. A memory subsystem that includes a set of parallel memory channels is disclosed. Data is saved such that a duplicate copy of data is saved to the opposite memory channel according to a horizontal mirroring scheme or a vertical mirroring scheme. A cyclic redundancy code is generated on the basis of the data bits and address bits. The generated cyclic redundancy code and a copy of the cyclic redundancy code are saved to the memory channels according to a horizontal mirroring scheme or a vertical mirroring scheme.

9 Claims, 5 Drawing Sheets

SYSTEM AND METHOD FOR ERROR DETECTION IN A REDUNDANT MEMORY SYSTEM

CROSS-REFERENCE TO RELATED APPLICATIONS

This application is a divisional application of U.S. application Ser. No. 10/960,465 filed on Oct. 7, 2004 now abandoned, the entire disclosure of which is incorporated herein by reference.

TECHNICAL FIELD

The present disclosure relates generally to computer systems and information handling systems, and, more particularly, to a system and method for detecting errors in mirrored memory

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Memory systems, including mirrored memory systems, often use Hamming error correction codes for the purpose of identifying errors in saved data. Although Hamming error correction codes may be effective at identifying single bit errors, Hamming error correction codes are less effective at identifying multiple bit errors. The inability of these memory systems to handle multi-bit errors may cause an error correction routine to be performed that is itself flawed but nonetheless recognized as being correct and yielding valid data. In addition, some multi-bit errors may not be recognized. As a result, the incorrect data in the code word will not be corrected and will be recognized as valid. In addition, if there is a fault in the memory system that causes can address failure resulting in one or more addresses lines being in error, the accessed data at the memory location will return a valid error correction code, but will nevertheless be wrong data.

SUMMARY

In accordance with the present disclosure, a system and method is disclosed for detecting errors in memory. A memory subsystem that includes a set of parallel memory channels is disclosed. Data is saved such that a duplicate copy of data is saved to the opposite memory channel according to a horizontal mirroring scheme or a vertical mirroring scheme. A cyclic redundancy code is generated on the basis of the data bits and address bits. The generated cyclic redundancy code and a copy of the cyclic redundancy code are saved to the memory channels according to a horizontal mirroring scheme or a vertical mirroring scheme.

The system and method disclosed herein is technically advantageous because it provides a technique for improved error detection with the additional benefit of mirrored memory. The system and method herein is advantageous because of the use of a cyclic redundancy code as a method for identifying errors in the saved data bits, with the result being improved error detection. The system and method disclosed herein is also advantageous because the cyclic redundancy code is generated on the basis of the data bits and the address bits associated with the data bits. As such, if an error occurs in the bits of the address bits, the error will be detected.

The system and method disclosed herein is also advantageous because of the use of a mirrored memory for storing the data within the memory subsystem. If an error in a version of stored data is detected, the requested data can be retrieved from the copy of the data that is saved in another location in memory. The saved copy of the data can be accessed in place of the version of the data that includes the error. The system and method disclosed herein is additionally advantageous in that the cyclic redundancy code is mirrored between the parallel memory channels, thereby allowing the integrity of the duplicate copy of the data to be evaluated in the event that an error is detected in the first version of the data. The system and method disclosed herein is also advantageous because an error can be detected through the use of a cyclic redundancy code, thereby eliminating the need to perform a comparison of the data bits during each read cycle. Because a comparison step need not be performed, independent operations can occur simultaneously on each memory channel, thereby preserving the available memory bandwidth of the memory subsystem. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
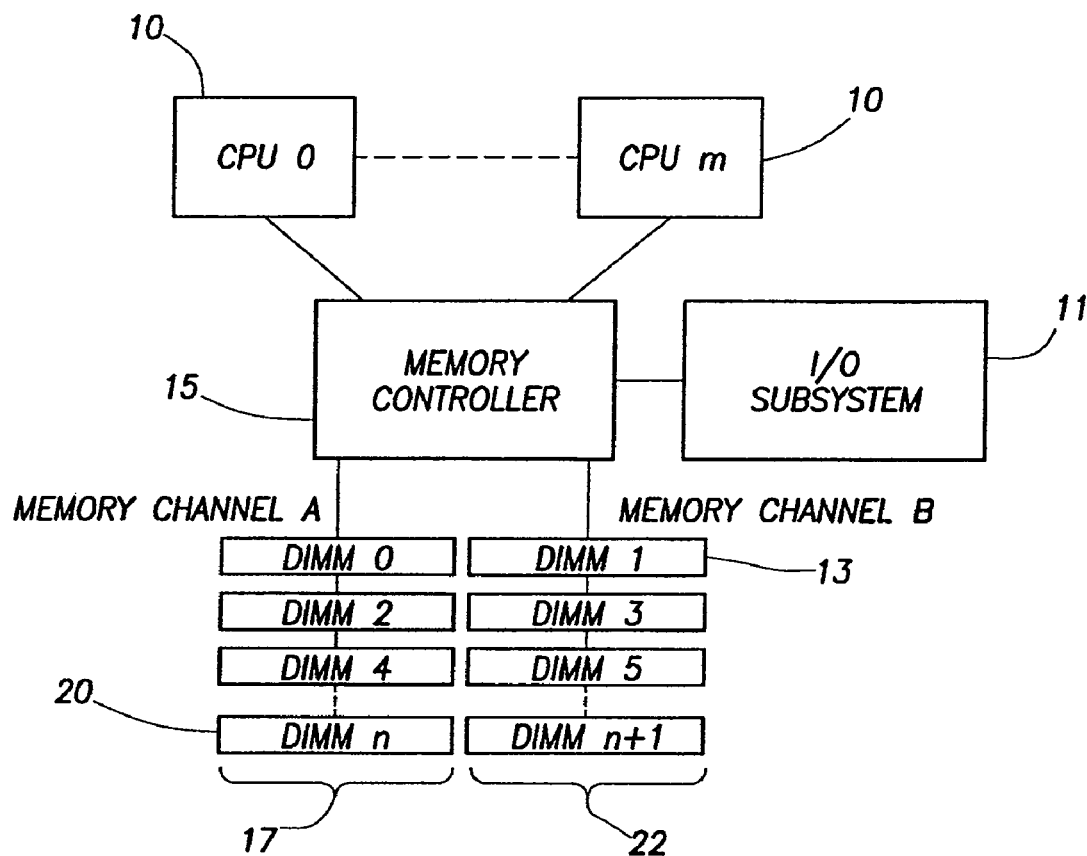
FIG. 1 is a diagram of a memory subsystem of a computer system.

Shown in FIG. 1 is a diagram of a memory subsystem of a computer system. The computer system includes one or more processors, which are indicated at 10 and are labeled as CPU 0 through CPU m. Each of the processors 10 is communicatively coupled to a memory controller 15, which is also coupled to an I/O subsystem 11. Coupled to memory controller 15 are two memory channels, which are identified as Memory Channel A at 20, and Memory Channel B at 22. The term memory channel is used herein to denote the interface through which a set of memory chips within a dual inline memory module (DIMMs) 13 can be accessed by a memory controller 15. The function of memory controller 15, which may comprise a single logic component, is to coordinate the writing of data to and the reading of data from the DIMMs 13 in each of the memory channels. Memory controller 15 functions as an interface between system memory and the processing units of the computer system. Memory Channel A and Memory Channel B are logically parallel to one another, as data that is saved only to a memory location in Memory Channel A would not be found in a memory location in Memory Channel B, and data saved only to a memory location in Memory Channel A could not found in a memory location in Memory Channel B.

Figure 2:
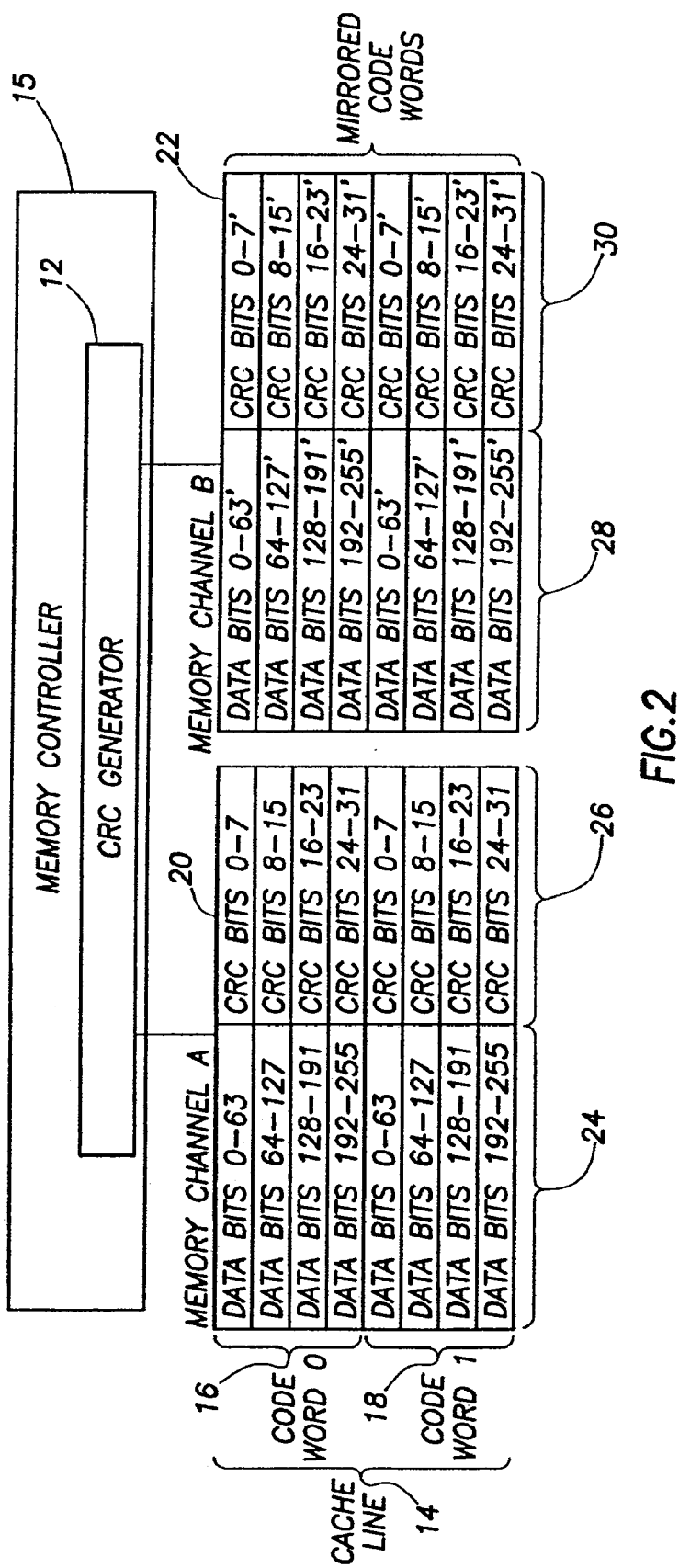
FIG. 2 is a diagram of the memory controller and a pair of parallel memory channels with data stored therein according to a horizontal mirroring scheme.

Shown in FIG. 2 is a diagram of the memory controller 15 and the memory channels 20 and 22. Included in Memory Channel A are two code words, which are identified at 16 and 18. In this example, each code word includes a set of data bits that are thirty-two bytes long and spans four rows of memory such that eight data bytes of the code word are in each memory line. With reference to Memory Channel A in FIG. 2, data bits 0-63 of Code Word 0 are in the first memory line, followed by data bits 64-127 in the second memory line, data bits 128-191 in the third memory line, and data bits 192-255 in the fourth memory line. The data bits for Code Word 1 in Memory Channel A follow the same format. Cache line 14 is sixty-four data bytes wide and includes both Code Word 0 and Code Word 1. The data bits and address bits of each code word are associated and saved with a cyclic redundancy code (CRC). Each cyclic redundancy code is four bytes wide and is saved across the four memory lines of the associated code word. With reference to Memory Channel A and code word 0 of FIG. 2, bits 0-7 of the cyclic redundancy code are stored in the first memory line; bits 8-15 of the cyclic redundancy code are stored in the second memory line; bits 16-23 of the cyclic redundancy code are stored in the third memory line; and bits 24-31 of the cyclic redundancy code are stored in the fourth memory line. Each cyclic redundancy code of a code word is associated with the data bits of the code word.

A cyclic redundancy code is a code associated with and derived from the data bits and the address location of the code word. On the basis of the bits comprising the data and the address of the code word, the cyclic redundancy code is generated in logic module 12 in memory controller 15. The thirty-two CRC bits associated with a given code word are created on the basis of an algorithm in a finite state machine in the logic module 12. Using the CRC bits for a code word, the an error in the data bits of a code word can be accomplished by generating a cyclic redundancy code for a code word and comparing the generated cyclic redundancy code with the cyclic redundancy code stored in the memory lines associated with the code word.

The content of Memory Channel A of FIG. 2 is horizontally mirrored in Memory Channel B. Each code word, including the data bits of the code word and the CRC bits of the code word, are mirrored in the like memory line in Memory Channel B. As an example, data bits 0-63 and CRC bits 0-7 of the first memory line of Memory Channel A are mirrored in data bits 0-63' and CRC bits 0-7' in the first memory line of Memory Channel B. To achieve this mirrored condition between Memory Channel A and Memory Channel B, any write to a memory location in one memory channel is also written the same memory location in the opposite memory channel. The mirror scheme depicted in the memory channels of FIG. 2 is known as horizontal mirroring because all of the mirrored data for a single code word is located laterally in the opposite memory channel. If data is corrupted in one of the memory channels, a copy of the data can be retrieved from the opposite memory channels.

Figure 3:
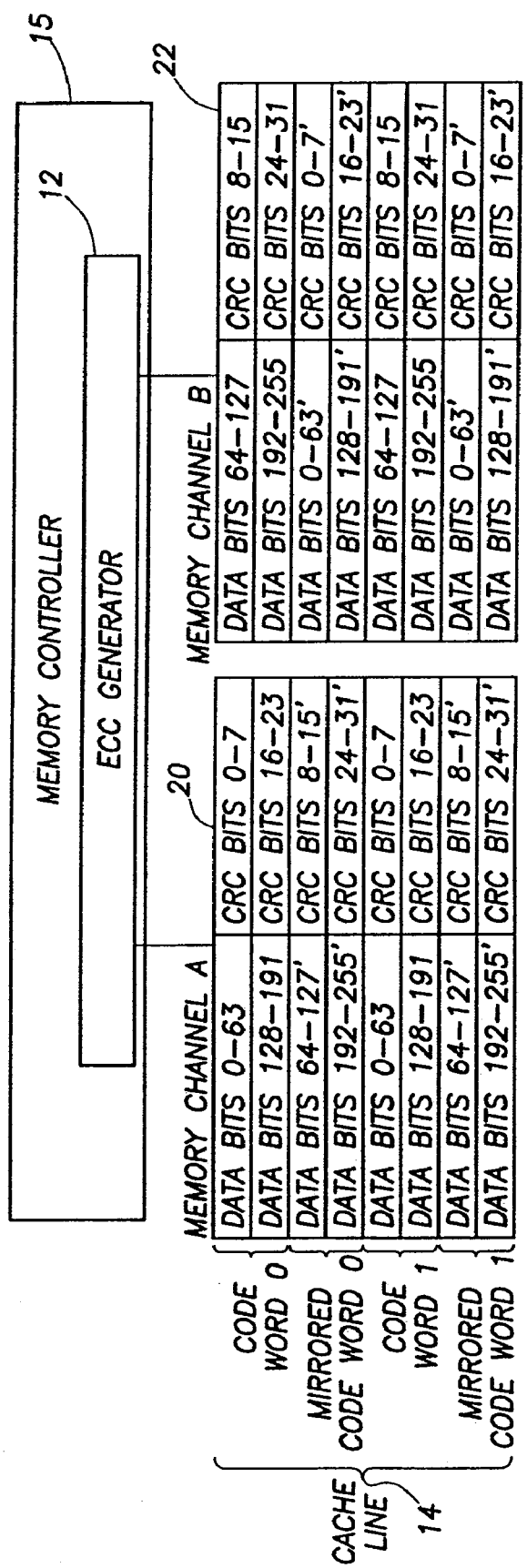
FIG. 3 is a diagram of the memory controller and a pair of parallel memory channels with data stored therein according to a parallel mirroring scheme.

Shown in FIG. 3 is a diagram of a memory controller and memory channels 20 and 22 that store data according to vertically mirrored scheme. Like the cache line of the memory channels of FIG. 2, the cache line of the memory channels of FIG. 3 is sixty-four bytes long and includes two code words, which are identified as Code Word 0 and Code Word 1. Unlike the memory organization depicted in the horizontal mirroring scheme of FIG. 2, the data bits and the associated CRC bits for each code word are distributed across Memory Channel A and Memory Channel B. As shown in FIG. 3, data bits 0-63 and CRC bits 0-7 are written to the first memory line of Memory Channel A, and data bits 64-127 and CRC bits 8-15 are written to the first memory line of Memory Channel B. Data bits 128-191 and CRC bits 16-23 are written to the second memory line of Memory Channel A, and data bits 192-255 and CRC bits 24-31 are written to the second memory line of Memory Channel A. Each code word is striped across the memory lines of the two memory channels.

The mirrored copy of the code word is likewise striped across the two memory channels. In contrast with a horizontal mirroring scheme of FIG. 2, the mirrored data in a vertical mirroring scheme is distributed between the two memory channels such that mirrored data for any set of data bits and CRC bits is saved to the opposite memory channel. As an example, data bits 0-63 and CRC bits 0-7 are saved in the first memory line of Memory Channel A. The mirrored version of data bits 0-63 and CRC bits 0-7 (data bits 0-63' and CRC bits 0-7') are saved to the third line of Memory Channel B. In the event of a failure of one of the memory channels, a complete copy of the data bits and CRC bits of each code word can be found in the opposite memory channel. As an example, if Memory Channel A were to fail, a copy of data bits 0-63 and 128-191 and CRC bits 0-7 and 16-23 can be found in Memory Channel B in the form of data bits 0-63' and 128-191' and CRC bits 0-7' and 16-23'. In this example, data bits 64-127 and 192-255 and CRC bits 8-15 and 24-31 would also be found in Memory Channel B.

Figure 4:
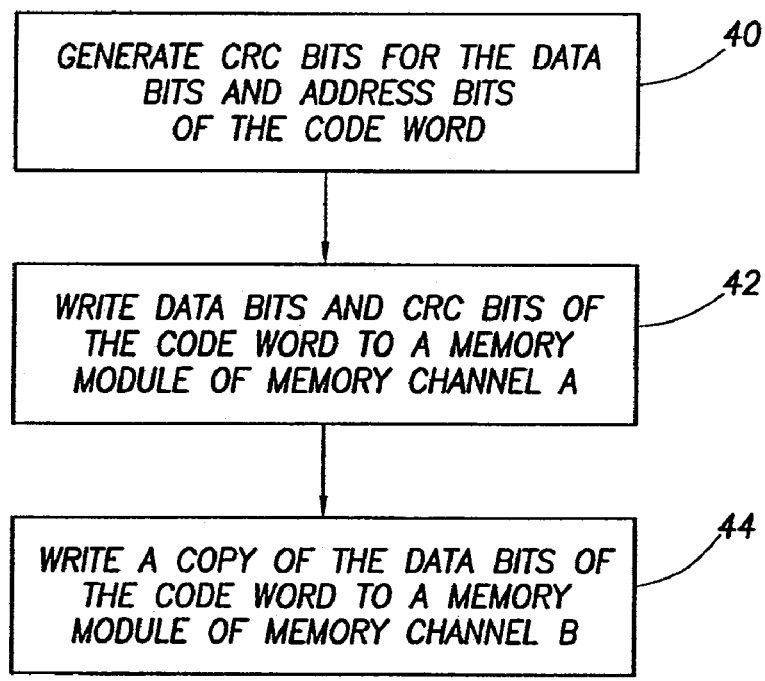
FIG. 4 is a flow diagram of a method for generating a set of cyclic redundancy code bits for a set of data bits and writing the data bits and cyclic redundancy code bits to horizontally mirrored memory.

Shown in FIG. 4 is a flow diagram of a method for generating a set of CRC bits for a set of data bits and writing the data bits and CRC bits to horizontally mirrored memory. At step 40, CRC Generator 12 generates the CRC bits for the data bits and address location of a code word. At step 42, the data bits and the generated CRC bits for each code word are written to a memory location in Memory Channel A. At step 44, the data bits and the CRC bits are written to a memory location in Memory Channel B. At the conclusion of the steps in FIG. 4, the data and the CRC bits are written to memory in the horizontally mirrored memory format of FIG. 2 in which a duplicate of the content of the memory locations of Memory Channel A can be found in Memory Channel B.

Figure 5:
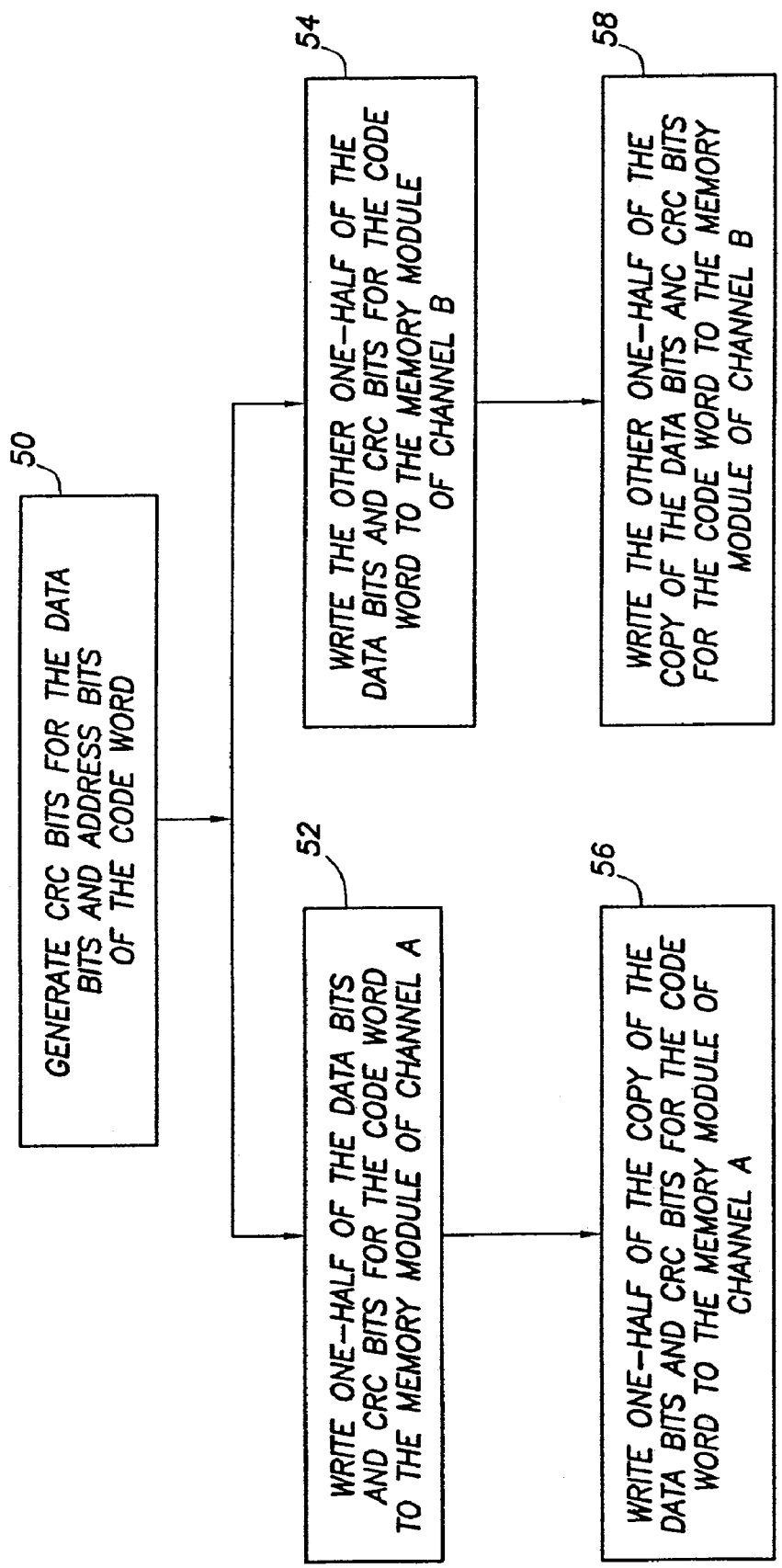
FIG. 5 is a flow diagram of a method for generating a set of cyclic redundancy code bits for a set of data bits and writing the data bits and cyclic redundancy code bits to vertically mirrored memory.

Shown in FIG. 5 is a flow diagram of a method for generating a set of CRC bits for a set of data bits and writing the data bits and CRC bits to vertically mirrored memory. At step 50, a set of CRC bits are generated for the data bits and address location of the code word. At step 52, one-half of the data bits and one-half of the CRC bits are written to a memory location in Memory Channel A. As an example of step 52, and with reference to the example of FIG. 3, data bits 0-63 and 128-191 and CRC bits 0-7 and 16-23 are written to a memory location in Memory Channel A. At step, 54, which can be performed in parallel with step 52, the other one-half of the data bits and the generated CRC bits are written to a memory location in Memory Channel B. As an example of step 54, and with reference to the example of FIG. 3, data bits 64-127 and 192-255 and CRC bits 8-15 and 24-31 are written to a memory location in Memory Channel B. At steps 56 and 58, a duplicate of the data bits and the CRC bits of the code word are written to memory locations in Memory Channels A and B. At step 56, one-half of the copy of the data bits and the generated CRC bits are written to a memory location in Memory Channel A. As an example of step 56, and with reference to the example of FIG. 3, data bits 64-127' and 192-255' and CRC bits 8-15' and 24-31' are written to a memory location in Memory Channel A. At step 58, the other one-half of the copy of the data bits and the generated CRC bits are written to a memory location in Memory Channel B. As an example of step 58, and with reference to the example of FIG. 3, data bits 0-63' and 128-191' and CRC bits 0-7' and 16-23' are written to a memory location in Memory Channel B. Following the steps of FIG. 5, the data and the CRC bits are written to memory in the vertically mirrored memory format of FIG. 3. As indicated by the structure of the flow diagram of FIG. 5, the steps of 52 and 56, which involve a write of one-half of the data bits and the CRC bits, can be performed in parallel with steps 54 and 58, which involve a write of the other one-half of the data bits and CRC bits.

Figure 6:
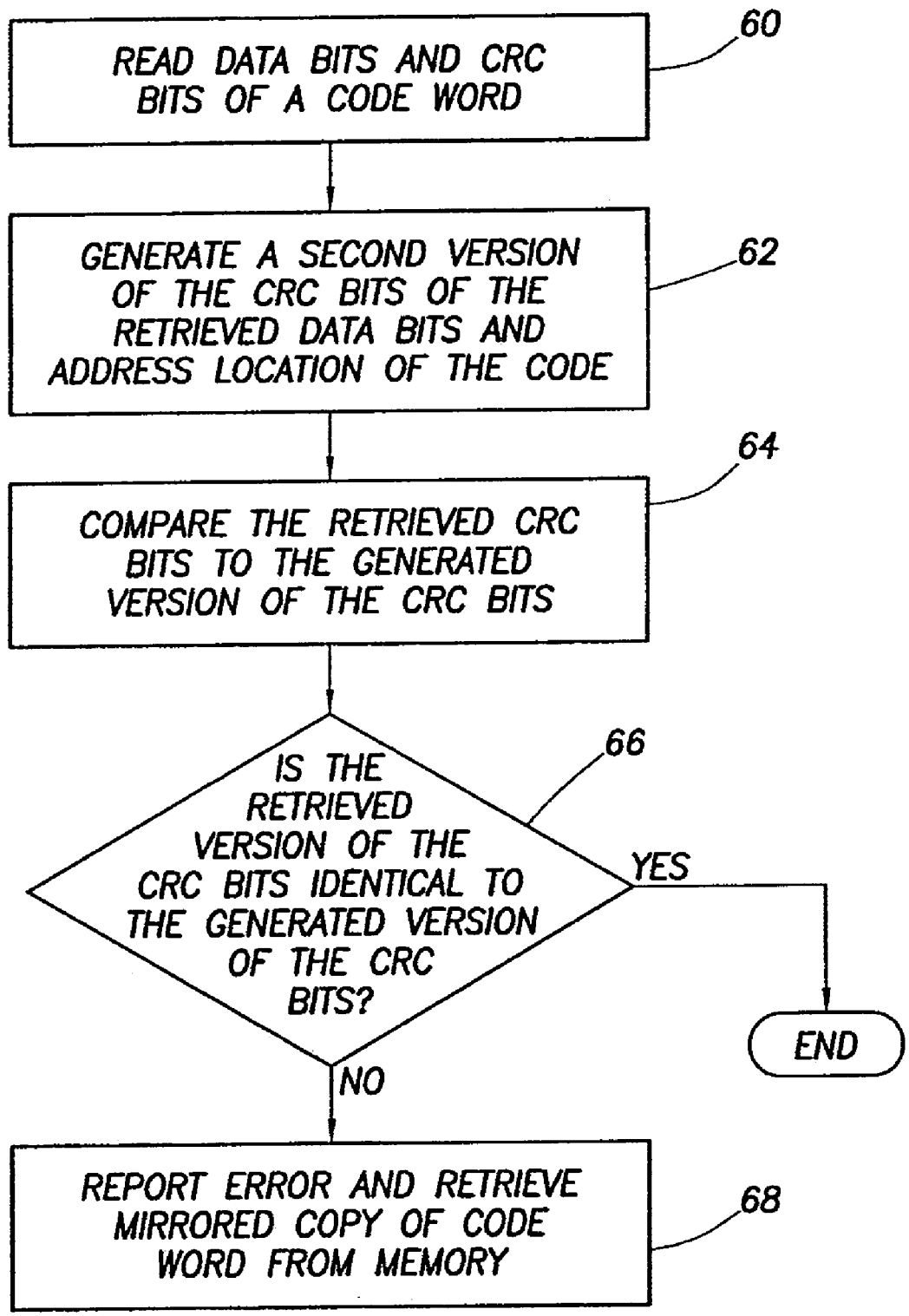
FIG. 6 is a flow diagram of a method for detecting an error in the data bits saved to a memory location.

Shown in FIG. 6 are a series of method steps for detecting an error in the data bits saved to a memory location. At step 60, the data bits and the CRC bits of a code word are retrieved to the memory controller. At step 62, a second version of the CRC bits is generated on the basis of the retrieved data bits and their address location. The generated second version of the CRC bits is compared at step 64 with the retrieved CRC bits. At step 64, it is determined whether the two sets of CRC bits are identical. If it is determined that the retrieved CRC bits are identical to the generated second version of the CRC bits, the processing of the flow diagram is complete, as the determination of identical CRC bits indicates that there is not an error in the retrieved data bits. If it is determined, however, that the retrieved CRC bits are not identical to the generated second version of the CRC bits, an error is reported and a copy of the code word is retrieved from memory at step 68. It should be recognized that this copy of the code word and its associated data bits can be evaluated for errors according to the method steps shown in FIG. 6.

Although the present invention has been described herein, in some instances, with respect to a computer system, it should be recognized that the system and method disclosed herein may be applied and used in any information handling system that includes single or multiple memory channels. Although the present disclosure has been described in detail, it should be understood that various changes, substitutions, and alterations can be made hereto without departing from the spirit and the scope of the invention as defined by the appended claims.

What is claimed is:

1. A method for identifying errors in the memory of a computer system, comprising:
   generating a set of cyclic redundancy code bits from a set of data bits and respective address bits;
   saving a first portion of the data bits and the cyclic redundancy bits through a first memory channel;
   saving a duplicate of the first portion of the data bits and the cyclic redundancy bits through a second memory channel;
   saving a second portion of the data bits and the cyclic redundancy bits through the second memory channel;
   saving a duplicate of the second portion of the data bits and the cyclic redundancy bits through the first memory channel;
   retrieving the first portion of the data bits and the cyclic redundancy code bits through the first memory channel and the second portion of the data bits and the cyclic redundancy code bits through the second memory channel;
   generating a second set of cyclic redundancy code bits on the basis of the retrieved data bits; and
   comparing the retrieved cyclic redundancy code bits with the second set of the cyclic redundancy code bits.

2. The method for identifying errors in the memory of a computer system of claim 1, further comprising the step of retrieving the duplicate of the first portion of the data bits and the cyclic redundancy code bits and the duplicate of the second portion of the data bits and the cyclic redundancy code bits if the retrieved cyclic redundancy code bits are not identical to the second set of the cyclic redundancy code bits.

3. The method for identifying errors in the memory of a computer system of claim 2, wherein the step of retrieving the duplicate of the data bits and the cyclic redundancy code bits is followed by the steps of:
   generating a third set of cyclic redundancy code bits on the basis of the retrieved duplicate data bits; and
   comparing the retrieved cyclic redundancy code bits with the third set of the cyclic redundancy code bits.

4. The method for identifying errors in the memory of a computer system of claim 2, wherein the step of generating a set of cyclic redundancy code bits from a set of data bits comprises the step of generating a set of cyclic redundancy code bits in a logic element of a memory controller.

5. The method for identifying errors in the memory of a computer system of claim 4, wherein the step of generating a second set of cyclic redundancy code bits on the basis of the retrieved data bits comprises the step of generating a second set of cyclic redundancy code bits in the logic element of the memory controller.

6. The method for identifying errors in the memory of a computer system of claim 1,
wherein the data bits are divided into four sets;
wherein the first and third sets comprise the first portion of the data bits saved through the first memory channel;
wherein the second and fourth sets comprise the second portion of the data bits saved through the second memory channel.

7. The method for identifying errors in the memory of a computer system of claim 1,
wherein the duplicate data bits are divided into four sets;
wherein the first and third sets comprise the first portion of the data bits saved though the second memory channel;
wherein the second and fourth sets comprise the second portion of the data bits saved through the first memory channel.

8. The method for identifying errors in the memory of a computer system of claim 1, wherein the first memory channel is logically parallel to the second memory channel.

9. The method for identifying errors in the memory of a computer system of claim 8, wherein the first memory channel and the second memory channel correspond to dual in-line memory modules.

* * * * *